US012208620B2

(12) United States Patent
Watanabe

(10) Patent No.: US 12,208,620 B2
(45) Date of Patent: Jan. 28, 2025

(54) LIQUID EJECTION APPARATUS CONTROL METHOD AND LIQUID EJECTION APPARATUS

(71) Applicant: SEIKO EPSON CORPORATION, Tokyo (JP)

(72) Inventor: Midori Watanabe, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 182 days.

(21) Appl. No.: 18/160,099

(22) Filed: Jan. 26, 2023

(65) Prior Publication Data

US 2023/0241894 A1 Aug. 3, 2023

(30) Foreign Application Priority Data

Jan. 28, 2022 (JP) ................................ 2022-011719

(51) Int. Cl.
*B41J 2/165* (2006.01)

(52) U.S. Cl.
CPC ....... *B41J 2/16552* (2013.01); *B41J 2/16505* (2013.01)

(58) Field of Classification Search
CPC .... B41J 2/165; B41J 2/16505; B41J 2/16507; B41J 2/16508; B41J 2/16523; B41J 2/16552; B41J 2/1707; B41J 2002/16573
See application file for complete search history.

(56) References Cited

U.S. PATENT DOCUMENTS

2007/0257956 A1 11/2007 Akase
2019/0100013 A1* 4/2019 Iida ...................... B41J 2/16526
2021/0016564 A1* 1/2021 Yamagishi ........... B41J 2/04581

FOREIGN PATENT DOCUMENTS

JP 2008-044337 A 2/2018

* cited by examiner

*Primary Examiner* — Julian D Huffman
(74) *Attorney, Agent, or Firm* — WORKMAN NYDEGGER

(57) ABSTRACT

In a method for controlling a liquid ejection apparatus including a liquid ejection head that ejects a plurality of types of liquids through a plurality of nozzles, a cap configured to form a closed space in which the nozzles open, and a cleaning unit configured to perform cleaning that causes liquid to be discharged from the nozzles to the cap and causes liquid to be discharged outside from the cap, cleaning is performed based on a result of correcting a relationship between a change in water evaporation rate and a change in viscosity of each type of liquid by using the amount of water contained in each type of liquid before water evaporation, a humectant substance amount in each type of liquid, an amount of water contained in a mixed liquid, which is a mixture of the types of liquids, before water evaporation, and a humectant substance amount in the mixed liquid.

7 Claims, 4 Drawing Sheets

LIQUID EJECTION APPARATUS CONTROL METHOD AND LIQUID EJECTION APPARATUS

The present application is based on, and claims priority from JP Application Serial Number 2022-011719, filed Jan. 28, 2022, the disclosure of which is hereby incorporated by reference herein in its entirety.

BACKGROUND

1. Technical Field

The present disclosure relates to a liquid ejection apparatus such as a printer and a method for controlling the liquid ejection apparatus.

2. Related Art

For example, a printer which is an example of a liquid ejection apparatus that performs printing by ejecting ink which is an example of a liquid through a plurality of nozzles formed in a recording head which is an example of a liquid ejection head is known as described in JP-A-2008-44337. The printer includes a cap that caps the nozzles.

The ink contains a humectant to prevent an increase in viscosity inside the nozzles. However, if water in the ink evaporates, the humectant absorbs surrounding moisture. Thus, when the nozzles are capped with an ink-attached cap, the humectant draws water from ink inside the nozzles. In the printer of JP-A-2008-44337, the cap is replenished with ink, such that the evaporated water is compensated for with the ink.

The printer of JP-A-2008-44337 replenishes the cap with a liquid such that the effective amount of water in the cap, which is the amount of water contained in the liquid minus the amount of water absorbed by the humectant, returns to an initial value. However, how the liquid changes in viscosity as the water evaporation rate changes differs from type to type. Thus, in a liquid ejection apparatus capable of ejecting a plurality of types of liquids, the viscosity of liquid in nozzles may increase more than expected even if the cap is replenished with liquid in accordance with one of the liquids.

SUMMARY

A liquid ejection apparatus control method for solving the above problems is a method for controlling a liquid ejection apparatus including a liquid ejection head configured to eject a plurality of types of liquids through a plurality of nozzles, a cap configured to form a closed space in which the plurality of nozzles open, and a cleaning unit configured to perform cleaning that causes the liquids to be discharged from the nozzles to the cap and causes the liquids to be discharged from the cap to an outside of the cap, the method including performing the cleaning based on a result of correcting a relationship between a change in water evaporation rate and a change in viscosity of each of the plurality of types of liquids by using an amount of water contained in each of the plurality of types of liquids before water evaporation, a humectant substance amount in each of the plurality of types of liquids, an amount of water contained, before water evaporation, in a mixed liquid that is a mixture of the plurality of types of liquids, and a humectant substance amount in the mixed liquid.

A liquid ejection apparatus for solving the above problems includes a liquid ejection head configured to eject a plurality of types of liquids through a plurality of nozzles, a cap configured to form a closed space in which the plurality of nozzles open, a cleaning unit configured to perform cleaning that causes the liquids to be discharged from the nozzles to the cap and causes the liquids to be discharged from the cap to an outside of the cap, and a control unit configured to cause the cleaning unit to perform the cleaning based on a result of correcting a relationship between a change in water evaporation rate and a change in viscosity of each of the plurality of types of liquids by using an amount of water contained in each of the plurality of types of liquids before water evaporation, a humectant substance amount in each of the plurality of types of liquids, an amount of water contained, before water evaporation, in a mixed liquid that is a mixture of the plurality of types of liquids and a humectant substance amount in the mixed liquid.

DESCRIPTION OF EXEMPLARY EMBODIMENTS

Embodiments

An embodiment of a liquid ejection apparatus and a method for controlling the liquid ejection apparatus will be described below with reference to the drawings. The liquid ejection apparatus is, for example, an inkjet printer that ejects ink, which is an example of a liquid, onto a medium such as paper, fabric, vinyl, a plastic part, or a metal part to perform printing on it.

Figure 1:
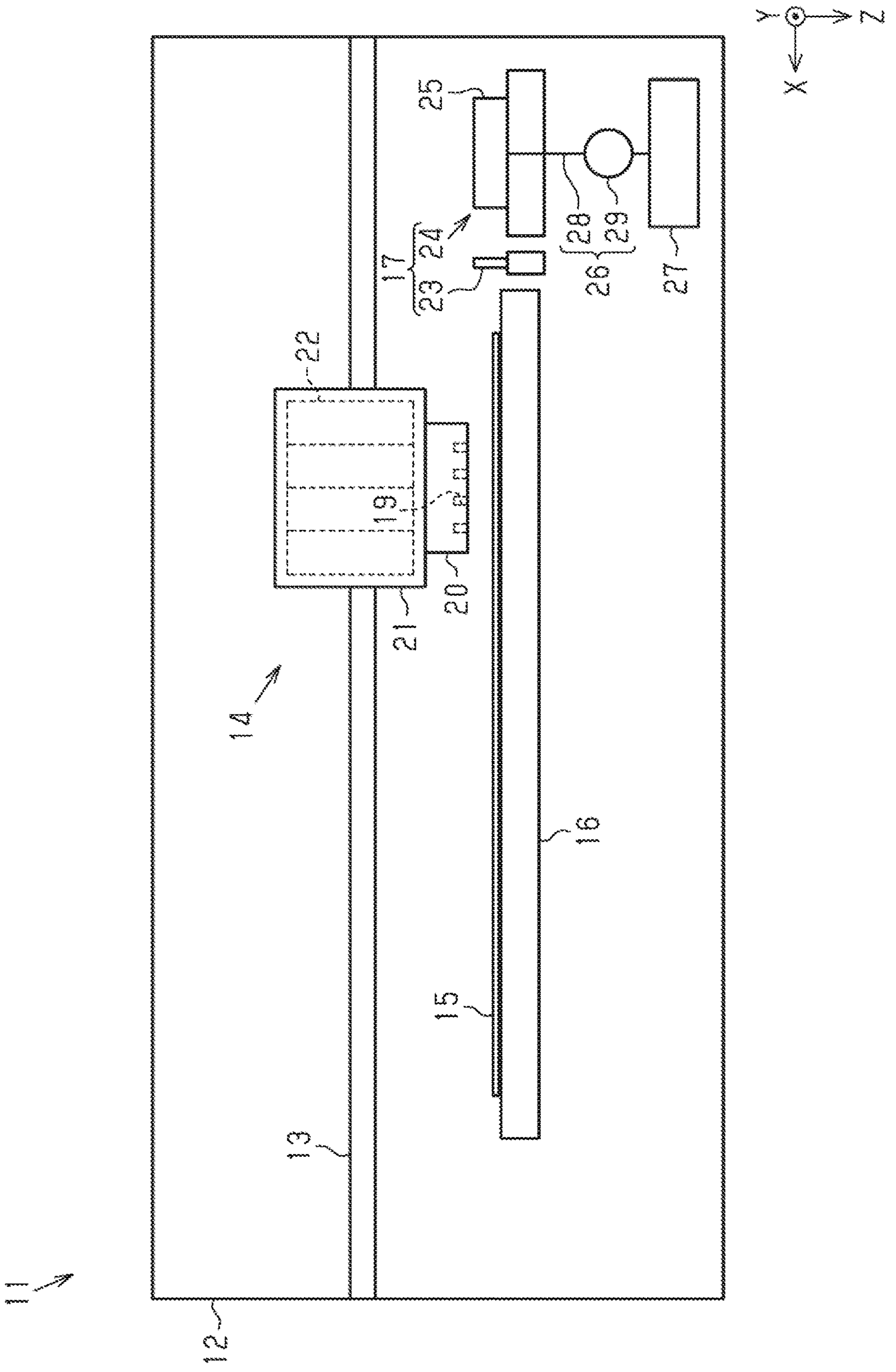
FIG. 1 is a schematic diagram of an embodiment of a liquid ejection apparatus.

In FIG. 1, a Z axis represents the direction of gravity and X and Y axes represent directions along a horizontal plane, assuming that the liquid ejection apparatus 11 is placed on the horizontal plane. The X, Y, and Z axes are orthogonal to each other. In the present embodiment, an increase in the viscosity of a liquid will also be referred to as thickening.

Liquid Ejection Apparatus

As shown in FIG. 1, the liquid ejection apparatus 11 may include a housing 12, a guide shaft 13, and a printing unit 14. The liquid ejection apparatus 11 may include a medium support portion 16 that supports a medium 15 and a maintenance unit 17.

The guide shaft 13 may be supported by the housing 12.

The printing unit 14 may be provided movably along the guide shaft 13. The printing unit 14 includes a liquid ejection head 20 having a plurality of nozzles 19. The printing unit 14 may include a carriage 21. The carriage 21 reciprocates the liquid ejection head 20 along the guide shaft 13.

The carriage 21 may move while carrying a plurality of liquid containers 22. The plurality of liquid containers 22 contain different types of liquids. When a single liquid container 22 can contain a plurality of types of liquids, the carriage 21 may move while carrying the single liquid container 22.

The plurality of types of liquids are supplied to the liquid ejection head 20. The liquid ejection head 20 can eject the plurality of types of liquids through the plurality of nozzles 19. The different types of liquids are, for example, inks of different colors. The liquid ejection head 20 may eject, for example, cyan, magenta, yellow, and black inks.

A nozzle 19 ejects a corresponding type of liquid. The number of nozzles 19 that eject a type of liquid may be different or the same for each type of liquid to be ejected. For example, the number of nozzles 19 that eject black ink may be greater than the numbers of nozzles 19 that eject cyan, magenta, and yellow inks. For example, the numbers of nozzles 19 that eject cyan, magenta, and yellow inks may be the same.

The maintenance unit 17 performs maintenance on the printing unit 14. The maintenance unit 17 may include a wiping portion 23. The maintenance unit 17 includes a cleaning unit 24. The cleaning unit 24 may include a cap 25, a suction mechanism 26, and a waste liquid container 27. The suction mechanism 26 may include a discharge path 28 and a discharge pump 29.

Figure 2:
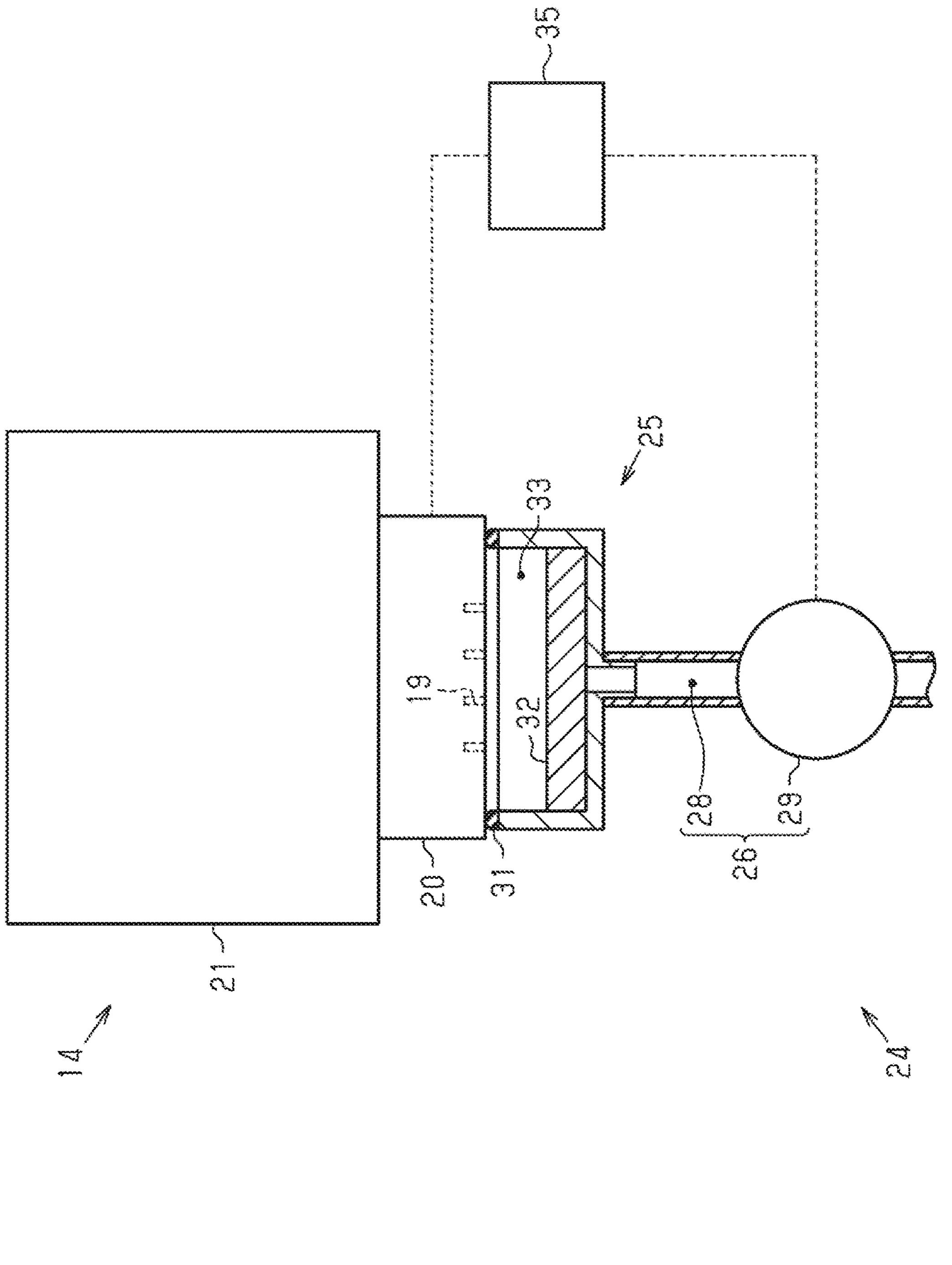
FIG. 2 is a schematic cross-sectional view of a cap.

The cap 25 is provided movably between a separated position shown in FIG. 1 and a capping position shown in FIG. 2. The cap 25 receives liquid ejected from the liquid ejection head 20.

The discharge path 28 connects the cap 25 and the waste liquid container 27. The discharge path 28 is connected at its upstream end to the cap 25 and is connected at its downstream end to the waste liquid container 27. The discharge path 28 may be made of a tube that deforms as the cap 25 moves.

The discharge pump 29 may be provided in the middle of the discharge path 28. The discharge pump 29 sends liquid in the cap 25 to the waste liquid container 27.

The waste liquid container 27 receives the liquid sent from the cap 25 as a waste liquid.

As shown in FIG. 2, the cap 25 may include a lip portion 31 and an absorbent member 32 capable of absorbing liquid.

The lip portion 31 can come into contact with the liquid ejection head 20. By the lip portion 31 coming into contact with the liquid ejection head 20, the cap 25 of the present embodiment forms a closed space 33 between the cap 25 and the liquid ejection head 20 in which the plurality of nozzles 19 open. For example, forming the lip portion 31 from elastically deformable rubber or elastomer can enhance sealing of the closed space 33.

The absorbent member 32 is capable of absorbing liquid. The absorbent member 32 may be formed of, for example, a sponge having voids capable of retaining liquid. The absorbent member 32 is positioned in the closed space 33 to keep the inside of the closed space 33 moist with the retained liquid.

Maintenance

As shown in FIG. 1, the wiping portion 23 is provided movably between a wiping position where it can wipe the liquid ejection head 20 and a non-wiping position where it is not in contact with the liquid ejection head 20. The wiping portion 23 located at the wiping position contacts the liquid ejection head 20 which is moving to wipe the liquid ejection head 20. Maintenance in which the wiping portion 23 wipes the liquid ejection head 20 is also referred to as wiping.

Maintenance in which the cap 25 forms the closed space 33 between the cap 25 and the liquid ejection head 20 as shown in FIG. 2 is also referred to as capping. The cap 25 located at the capping position caps the liquid ejection head 20 located at a home position. The cap 25 opens the closed space 33 by moving from the capping position to the separated position.

The suction mechanism 26 sucks liquid from the nozzles 19 through the closed space 33. Specifically, the suction mechanism 26 drives the discharge pump 29 to reduce the pressure in the closed space 33 to forcibly discharge liquid from the nozzles 19. The discharged liquid is received in the waste liquid container 27 as a waste liquid via the discharge path 28. Maintenance in which the pressure in the closed space 33 is reduced to forcibly discharge liquid from the nozzles 19 is also referred to as suction cleaning.

The suction mechanism 26 may drive the discharge pump 29 to discharge liquid in the cap 25 while the cap 25 is located at the separated position. The maintenance of forcibly discharging liquid in the cap 25 while the closed space 33 is open is also referred to as idle suction.

Maintenance in which liquid is discharged through ejection from the nozzles 19 is also referred to as idle ejection or flushing. The cap 25 may receive liquid that the liquid ejection head 20 has ejected through idle ejection. In the idle ejection of the present embodiment, the liquid ejection head 20 located at the home position ejects liquid toward the cap 25 located at the separated position.

The suction cleaning for discharging liquid from the nozzles 19 to the cap 25 while discharging liquid from the cap 25 to the outside of the cap 25 is an example of cleaning. The idle ejection for discharging liquid from the nozzles 19 to the cap 25 and the idle suction for discharging liquid from the cap 25 to the outside of the cap 25 are examples of cleaning. The cleaning unit 24 of the present embodiment can perform the suction cleaning, the idle ejection, and the idle suction as cleaning. The cleaning unit 24 may simultaneously or separately perform the discharge of liquid to the cap 25 and the discharge of liquid from the cap 25.

In the suction cleaning and idle ejection, a plurality of types of liquids are discharged from the liquid ejection head 20. The plurality of types of discharged liquids are mixed in the single cap 25. In the present embodiment, the liquid in the cap 25 is also referred to as a mixed liquid.

Electrical Configuration

As shown in FIG. 2, the liquid ejection apparatus 11 includes a control unit 35. The control unit 35 controls various components of the liquid ejection apparatus 11 such as the printing unit 14 and the cleaning unit 24.

The control unit 35 may be formed as a circuit including α) one or more processors that execute various processes according to a computer program, μ) one or more dedicated hardware circuits such as an application-specific integrated circuit that executes at least some of the various processes, or γ) a combination thereof. A processor includes a CPU and a memory such as a RAM and a ROM which stores program code or instructions configured to cause the CPU to perform processes. The memory, that is, a computer-readable medium, includes any readable medium that can be accessed by a general purpose or special purpose computer.

Liquid

A liquid contains a humectant and water. A liquid may contain a material such as a colorant. A humectant may be a polyhydric alcohol such as glycerin or diethylene glycol. A humectant has hygroscopic properties and retains absorbed water. The humectant prevents thickening of the liquid, and as a result, can prevent clogging of the nozzles 19.

In the present embodiment, the amount of substance of the humectant contained per unit amount of liquid is referred to as a humectant substance amount M (in mol/g). The humectant substance amount M varies depending on the type of the liquid.

In the present embodiment, the amount of water contained in the liquid is referred to as an amount of water. Water evaporates from the surface of the liquid where the liquid contacts the air. Thus, the amount of the liquid and the amount of water change. In the present embodiment, the amount of water contained per unit amount of liquid before water evaporation is referred to as an initial amount of water. The initial amounts of water of the plurality of types of liquids differ from each other. Therefore, a water ratio R, which is the proportion of water in a unit amount of liquid, varies depending on the type of the liquid.

As shown in Table 1, the control unit 35 may store the number of nozzles N, the water ratio R, and the humectant substance amount M in association with each type of liquid. The liquid ejection head 20 of the present embodiment can eject four types of liquids. The number of types of liquids that can be ejected by the liquid ejection head 20 may be less than four or may be more than four.

TABLE 1

| TYPE | NUMBER OF NOZZLES N | WATER RATIO R | HUMECTANT CONTENT M |
|---|---|---|---|
| FIRST LIQUID | N1 | R1 | M1 |
| SECOND LIQUID | N2 | R2 | M2 |
| THIRD LIQUID | N3 | R3 | M3 |
| FOURTH LIQUID | N4 | R4 | M4 |
| . | . | . | . |
| . | . | . | . |
| . | . | . | . |
| ith LIQUID | Ni | Ri | Mi |
| . | . | . | . |
| . | . | . | . |
| . | . | . | . |
| MIXED LIQUID | Nm | Rm | Mm |

The control unit 35 may store the number of nozzles Nm, a water ratio Rm, and a humectant substance amount Mm corresponding to the mixed liquid. The control unit 35 may calculate the number of nozzles Nm, the water ratio Rm, and the humectant substance amount Mm based on the number of nozzles Ni of each liquid (where i is the type of liquid) and store the calculated values. The proportion of each liquid in the mixed liquid is proportional to the number of nozzles Ni that eject the liquid.

The control unit 35 may calculate the number of nozzles Nm based on equation (1).

[Equation 1]

$$Nm = N1 + N2 + \ldots + Ni = \Sigma_i Ni \text{ (where } i \text{ is type of liquid)} \quad (1)$$

The number of nozzles Nm, which is the number of nozzles 19 corresponding to the mixed liquid, is the total number of nozzles 19 that eject liquid. The number of nozzles Nm may be the total number of nozzles 19 of the liquid ejection head 20.

The control unit 35 may calculate the water ratio Rm based on equation (2).

[Equation 2]

$$Rm = \frac{N1 \times R1}{Nm} + \frac{N2 \times R2}{Nm} + \ldots + \frac{Ni \times Ri}{Nm} = \sum_i (Ni \times Ri)/Nm \quad (2)$$

(where $i$ is type of liquid)

The water ratio Rm of the mixed liquid is the proportion of water in a unit amount of the mixed liquid.

The control unit 35 may calculate the humectant substance amount Mm based on equation (3).

[Equation 3]

$$Mm = \frac{N1 \times M1}{Nm} + \frac{N2 \times M2}{Nm} + \ldots + \frac{Ni \times Mi}{Nm} = \sum_i (Ni \times Mi)/Nm \quad (3)$$

(where $i$ is type of liquid)

The humectant substance amount Mm of the mixed liquid is the amount of substance of the humectant contained per unit amount of the mixed liquid.

In the present embodiment, the amount of water lost by evaporation out of water contained in each liquid is also referred to as an amount of evaporation. In the present embodiment, the ratio of the amount of water evaporated to the liquid before evaporation is also referred to as a water evaporation rate.

Figure 3:
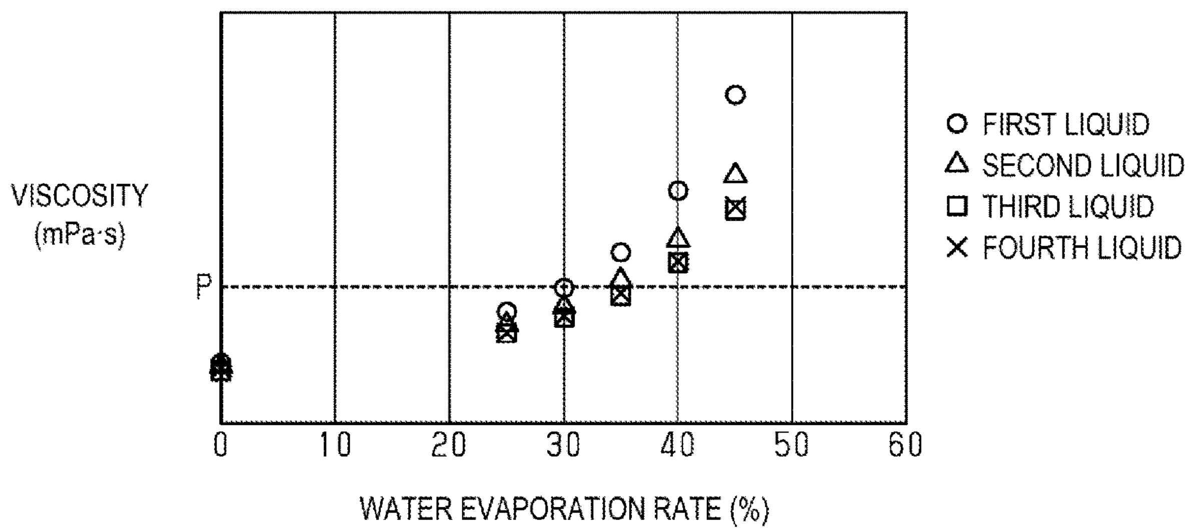
FIG. 3 is a graph showing the relationship between changes in moisture evaporation rate and changes in viscosity before correction.

Because the plurality of types of liquids have different contents of water and humectant, their changes in viscosity with respect to the water evaporation rate differ as shown in FIG. 3. In the present embodiment, the control unit 35 corrects the relationship between the change in water evaporation rate and the change in viscosity of each of the plurality of types of liquids by using the water ratios R1 to R4 of the liquids, the humectant substance amounts M1 to M4 of the liquids, the water ratio Rm of the mixed liquid, and the humectant substance amount Mm of the mixed liquid.

The water ratios R1 to R4 are the water ratios of the plurality of types of liquids and the humectant substance amounts M1 to M4 are the humectant substance amounts of the plurality of types of liquids. The water ratio Rm is the water ratio of the mixed liquid and the humectant substance amount Mm is the humectant substance amount in the mixed liquid.

The control unit 35 corrects the relationship between the change in water evaporation rate and the change in viscosity of each of the plurality of types of liquids based on equation (4).

[Equation 4]

$$\text{Evaporation rate of mixed liquid} = Rm - (\text{Water ratio } Ri \text{ of each liquid} - \text{Evaporation rate of each liquid}) \times Mm/\text{Humectant substance amount } Mi \text{ of each liquid (where } i \text{ is type of liquid)} \quad (4)$$

Figure 4:
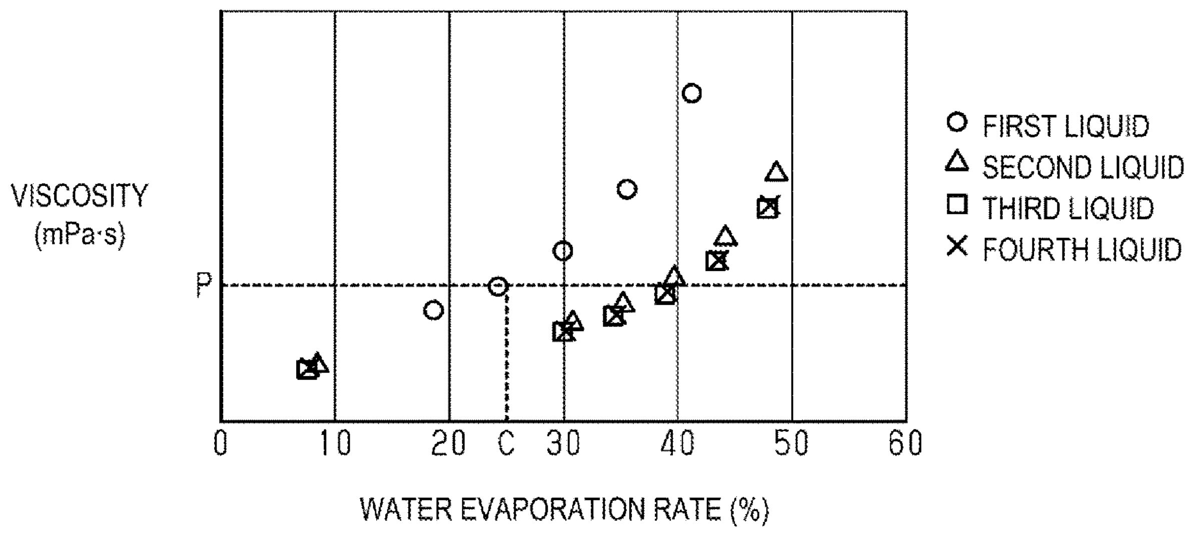
FIG. 4 is a graph showing the relationship between changes in moisture evaporation rate and changes in viscosity after correction.

FIG. 4 shows a result of correcting the relationship between the change in water evaporation rate and the change in viscosity of each of the plurality of types of liquids based on equation (4). When the cap 25 forms the closed space 33, the vapor pressures of the mixed liquid in the cap 25 and the first to fourth liquids in the nozzles 19 are balanced. A specified viscosity P is set to the viscosity of liquid that the liquid ejection head 20 can eject. The specified viscosity P is preset based on a result of causing the liquid ejection head 20 to be used to eject liquids with different viscosities. As the specified viscosity P, it is possible to set a limit viscosity which is the limit of viscosity at which the liquid ejection head 20 can discharge liquid or a viscosity that is lower than the limit viscosity by a predetermined amount in consideration of a margin.

In the present embodiment, a liquid that reaches the specified viscosity P at a lowest water evaporation rate among the plurality of types of liquids is set as a reference liquid as a result of the correction. In the present embodiment, the water evaporation rate at which the reference liquid reaches the specified viscosity P is defined as a specified water evaporation rate. That is, in the case of FIG. 4, the first liquid is the reference liquid and the specified water evaporation rate is about 25%. The control unit 35 may store a preliminary water evaporation rate lower than the specified water evaporation rate together with the specified water evaporation rate.

Next, a method for controlling the liquid ejection apparatus 11 will be described with reference to a flowchart shown in FIG. 5. The control unit 35 may perform a maintenance routine shown in FIG. 5 when the liquid ejection apparatus 11 is powered on.

Figure 5:
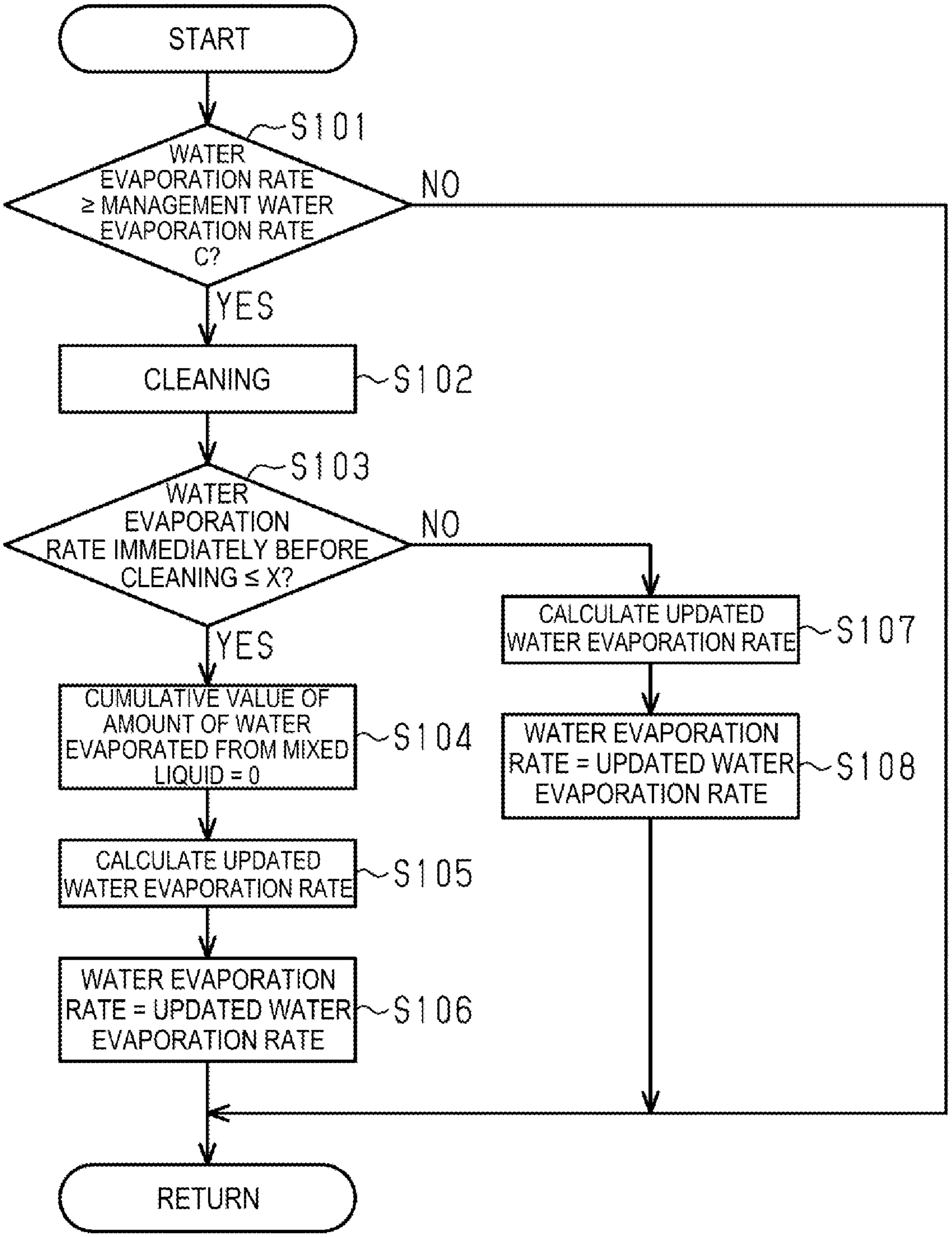
FIG. 5 is a flowchart showing a maintenance routine.

As shown in FIG. 5, in step S101, the control unit 35 determines whether the water evaporation rate of the mixed liquid is equal to or higher than a management water evaporation rate C. Here, the management water evaporation rate C may be set to the specified water evaporation rate or may be set to the preliminary water evaporation rate lower than the specified water evaporation rate in consideration of evaporation due to being left unattended or the like. If the water evaporation rate is equal to or higher than the management water evaporation rate C, the control unit 35 determines YES in step S101 and moves the process to step S102.

In step S102, the control unit 35 performs cleaning. After that, in step S103, the control unit 35 determines whether the water evaporation rate immediately before cleaning is equal to or less than a limit water evaporation rate X. The limit water evaporation rate X is the limit of water evaporation rate at which the cumulative value of the amount of water evaporated from the mixed liquid in the cap 25 can be returned to a value as close to 0 as possible by the cleaning of step S102 and cleaning is normally set such that the limit water evaporation rate X is higher than the specified water evaporation rate. If the water evaporation rate immediately before cleaning is equal to or less than the limit water evaporation rate X, the control unit 35 determines YES in step S103 and moves the process to step S104.

In step S104, the control unit 35 sets the cumulative value of the amount of water evaporated from the mixed liquid to zero, and in step S105, calculates an updated water evaporation rate. After that, in step S106, the control unit 35 sets the water evaporation rate of the mixed liquid to the updated water evaporation rate and terminates the process. If the water evaporation rate of the mixed liquid is lower than the management water evaporation rate C in step S101, the control unit 35 determines NO in step S101 and terminates the process.

If the water evaporation rate immediately before cleaning is higher than the limit water evaporation rate X in step S103, for example, if evaporation has proceeded more than expected until cleaning is performed due to being left unattended, the control unit 35 determines NO in step S103 and moves the process to step S107. In step S107, the control unit 35 calculates an updated water evaporation rate. In step S108, the control unit 35 sets the water evaporation rate of the mixed liquid to the updated water evaporation rate and terminates the process.

Operation of Embodiment

The operation of the present embodiment will be described.

The control unit 35 performs cleaning based on the result of correcting using the relationship between the change in water evaporation rate and the change in viscosity of each of the plurality of types of liquids.

Specifically, the control unit 35 sets the management water evaporation rate C based on the result of correcting the relationship between the change in water evaporation rate and the change in viscosity of each of the plurality of types of liquids. The control unit 35 may perform cleaning based on the management water evaporation rate C. The control unit 35 calculates the water evaporation rate of the mixed liquid, compares the calculated water evaporation rate with the management water evaporation rate C, and performs cleaning.

If the water evaporation rate is lower than the management water evaporation rate C, the control unit 35 may calculate an updated water evaporation rate based on a decrease in the amount of water due to evaporation. With regard to evaporation, the control unit 35 may calculate the updated water evaporation rate based on the following equations.

Updated water evaporation rate=Cumulative value of amount of water evaporated from mixed liquid up to the time of current calculation/Cumulative value of amount of mixed liquid replenished and discharged up to the time of current calculation Amount of mixed liquid at the time of current calculation=Amount of mixed liquid at the time of previous calculation−Amount of water evaporated from mixed liquid from the time of previous calculation to the time of current calculation Cumulative value of amount of water evaporated from mixed liquid up to the time of current calculation=Cumulative value of amount of water evaporated from mixed liquid up to the time of previous calculation+Amount of water evaporated from mixed liquid from the time of previous calculation to the time of current calculation Cumulative value of amount of mixed liquid replenished and discharged up to the time of current calculation=Cumulative value of amount of mixed liquid replenished and discharged up to the time of previous calculation Here, the cumulative value of the amount of the mixed liquid is a value that increases by replenishment which will be described later and decreases by discharge such as idle suction which will be described later and the cumulative value of the amount of water evaporated from the mixed liquid is a value that increases usually but decreases during discharge due to idle suction or the like which will be described later.

If the water evaporation rate is lower than the management water evaporation rate C, the control unit 35 may calculate an updated water evaporation rate based on an increase in the amount of water due to replenishment such as idle ejection. With regard to replenishment, the control unit 35 may calculate the updated water evaporation rate based on the following equations.

Updated water evaporation rate=Cumulative value of amount of water evaporated from mixed liquid up to the time of current calculation/Cumulative value of amount of mixed liquid replenished and discharged up to the time of current calculation Amount of mixed liquid at the time of current calculation=Amount of mixed liquid at the time of previous calculation+Amount of mixed liquid replenished by current replenishment Cumulative value of amount of water evaporated from mixed liquid up to the time of current calculation=Cumulative value of amount of water evaporated from mixed liquid up to the time of previous calculation−Amount of mixed liquid replenished by current replenishment×Evaporation coefficient Cumulative value of amount of mixed liquid replenished and discharged up to the time of current calculation=Cumulative value of amount of mixed liquid replenished and discharged up to the time of previous calculation+Amount of mixed liquid replenished by current replenishment Here, the cumulative value of the amount of the mixed liquid is a value that increases by replenishment and decreases by discharge such as idle suction which will be described later and the cumulative value of the amount of water evaporated from the mixed liquid is a value that increases usually but decreases during discharge due to idle suction or the like which will be described later.

If the water evaporation rate is lower than the updated water evaporation rate, the control unit 35 may calculate an updated water evaporation rate based on a decrease in the amount of water due to discharge such as idle suction. With regard to discharge, the control unit 35 may calculate the updated water evaporation rate based on the following equations.

Updated water evaporation rate=Cumulative value of amount of water evaporated from mixed liquid up to the time of current calculation/Cumulative value of amount of mixed liquid replenished and discharged up to the time of current calculation Amount of mixed liquid at the time of current calculation=Initial amount of mixed liquid Cumulative value of amount of water evaporated from mixed liquid up to the time of current calculation=Cumulative value of amount of water evaporated from mixed liquid up to the time of previous calculation×Initial amount of mixed liquid/Amount of mixed liquid at the time of previous calculation Cumulative value of amount of mixed liquid replenished and discharged up to the time of current calculation=Cumulative value of amount of mixed liquid replenished and discharged up to the time of previous calculation×Initial amount of mixed liquid/Amount of mixed liquid at the time of previous calculation Here, the cumulative value of the amount of the mixed liquid is a value that increases by replenishment which has been described above and decreases by discharge such as idle suction and the cumulative value of the amount of water evaporated from the mixed liquid is a value that increases usually but decreases during discharge due to idle suction or the like.

The control unit 35 may perform cleaning when the water evaporation rate in the cap 25 has reached the management water evaporation rate C. The water evaporation rate in the cap 25 is also the water evaporation rate of the mixed liquid. The cleaning is, for example, suction cleaning. When cleaning is performed when the water evaporation rate is equal to or higher than the management water evaporation rate C and equal to or lower than the limit water evaporation rate X, the control unit 35 may calculate the updated water evaporation rate based on the following equations.

Updated water evaporation rate=Cumulative value of amount of water evaporated from mixed liquid up to the time of current calculation/Cumulative value of amount of mixed liquid replenished and discharged up to the time of current calculation Amount of mixed liquid at the time of current calculation=Initial amount of mixed liquid Cumulative value of amount of water evaporated from mixed liquid up to the time of current calculation=0 Cumulative value of amount of mixed liquid replenished and discharged up to the time of current calculation=Initial amount of mixed liquid When cleaning is performed after the water evaporation rate exceeds the management water evaporation rate C and the limit water evaporation rate X due to being left unattended or the like, the control unit 35 may combine the calculation associated with replenishment and the calculation associated with discharge to calculate the updated water evaporation rate.

Advantages of Embodiment

Advantages of the present embodiment will be described.

(1) The relationship between the change in water evaporation rate and the change in viscosity of each of the plurality of types of liquids is corrected using the amount of water and the humectant substance amount M contained in each of the plurality of types of liquids and the mixed liquid. The mixed liquid is a mixture, in the cap 25, of the plurality of types of liquids discharged from the plurality of nozzles 19. Thus, by performing cleaning based on the correction result, it is possible to perform cleaning considering the plurality of types of liquids and the mixed liquid and prevent an increase in the viscosity of liquid in the nozzles 19.

(2) Cleaning is performed based on the specified water evaporation rate of the reference liquid which most easily increases in viscosity among the plurality of types of liquids. That is, because cleaning is performed in accordance with a liquid which easily increases in viscosity, it is possible to further prevent an increase in viscosity in the nozzles 19.

(3) Because cleaning is performed when the water evaporation rate in the cap 25 has reached the specified water evaporation rate, it is possible to reduce the risk that the viscosity of liquid in the nozzles 19 will increase, causing an ejection failure.

(4) Because cleaning is performed when the water evaporation rate in the cap 25 has reached the preliminary water evaporation rate that is lower than the specified water evaporation rate, it is possible to reduce the risk that the risk that the water evaporation rate in the cap 25 will exceed the specified water evaporation rate.

(5) Because the cumulative value of the amount of water evaporated from the mixed liquid in the cap 25 is set to zero upon the cleaning, it is possible to reduce the load on the control unit 35, for example, compared to when the water evaporation rate is calculated.

(6) Because the water evaporation rate in the cap 25 after cleaning is set to the calculated updated water evaporation rate, it is possible to improve the accuracy of the water evaporation rate in the cap 25 after cleaning.

Modifications

The present embodiment can be modified and implemented as follows. The present embodiment and the following modifications can be combined and implemented within a technically consistent range.

The control unit 35 may periodically perform idle ejection and update of the water evaporation rate during printing.

The liquid ejection apparatus 11 may include a pressurizing mechanism that pressurizes the liquid in the liquid ejection head 20. The liquid ejection apparatus 11 may perform pressurized cleaning, in which the pressurized liquid is discharged from the nozzles 19, as the cleaning.

The control unit 35 may perform at least one of suction cleaning, idle ejection, idle suction, and pressurized cleaning in step S102 of FIG. 5. The control unit 35 may perform a combination of suction cleaning, idle ejection, idle suction, and pressurized cleaning as the cleaning.

The control unit 35 may perform cleaning that causes liquid to be discharged from all nozzles 19 at once. The control unit 35 may perform cleaning that causes liquid to be discharged from some of the nozzles 19. For example, the control unit 35 may perform cleaning for each group of nozzles 19 that eject the same type of liquid. The control unit 35 may calculate an updated water evaporation rate according to the type of liquid to be discharged. Even when cleaning has been performed when the water evaporation rate in the cap 25 is equal to or higher than the management water evaporation rate C and equal to or lower than the limit water evaporation rate X, the control unit 35 may calculate an updated water evaporation rate and set the water evaporation rate in the cap 25 to the updated water evaporation rate.

The control unit 35 may set the cumulative value of the amount of water evaporated from the mixed liquid up to the time of current calculation to zero regardless of the cleaning to be performed and the water evaporation rate at that time.

The control unit 35 may perform cleaning based on either one of the management water evaporation rate C and the preliminary water evaporation rate.

The control unit 35 may perform cleaning at time intervals shorter than a time interval until the amount of evaporated water exceeds the management water evaporation rate C after cleaning is performed.

The liquid container 22 may be a replaceable cartridge or a tank that can be replenished with liquid. The liquid container 22 may be provided at a position different from the carriage 21. The liquid ejection head 20 may eject a liquid that has been supplied thereto from the liquid container 22 through a liquid supply channel.

In the case of a liquid ejection apparatus that uses a liquid container 22 with a small capacity, a sufficient amount of cleaning cannot be set and thus the limit water evaporation rate X may become smaller than the specified water evaporation rate. In such a case, the limit water evaporation rate X or a water evaporation rate smaller than the limit water evaporation rate X may be set as the management water evaporation rate C.

The liquid ejection apparatus 11 may be a liquid ejection apparatus that sprays or ejects a liquid other than ink. The state of the liquid ejected from the liquid ejection apparatus in the form of minute droplets includes granular, tear-like, and thread-like trailing ones. The liquid referred to here may be any material that can be ejected from the liquid ejection apparatus. For example, the liquid may be a material in a state where it is in a liquid phase and includes a fluid material such as a liquid material with a high or low viscosity, sol, gel water, other inorganic solvents, an organic solvent, a solution, a liquid resin, a liquid metal, and a metal melt. The liquid includes not only a liquid which is a state of a substance but also particles of a functional material made of a solid substance, such as pigment or metal particles, dissolved, dispersed, or mixed in a solvent, and the like. Typical examples of the liquid include the inks described in the above embodiments and a liquid crystal. Here, the inks include general water-based and oil-based inks and various other liquid compositions such as gel inks and hot-melt inks. A specific example of the liquid ejection apparatus is an apparatus that ejects a liquid that contains, for example, a material, such as an electrode material or a coloring material used in the manufacture of liquid crystal displays, electroluminescence displays, surface emitting displays, or color filters, in a dispersed or dissolved form. The liquid ejection apparatus may be an apparatus that ejects a bioorganic material used in the manufacture of biochips, an apparatus that ejects a sample liquid used as a precision pipette, a printing apparatus, a microdispenser, or the like. The liquid ejection apparatus may be an apparatus that ejects lubricating oil to a precision machine such as a watch or a camera with pinpoint precision or an apparatus that ejects a transparent resin liquid such as an ultraviolet curable resin onto a substrate to form a micro-hemispherical lens, an optical lens, or the like used in an optical communication device or the like. The liquid ejection apparatus may be an apparatus that ejects an etchant such as acid or alkali to etch a substrate or the like.

Supplementary Description

Technical ideas derived from the above embodiment and modifications and operations and advantages of the technical ideas will be described below.

(A) A liquid ejection apparatus control method is a method for controlling a liquid ejection apparatus including a liquid ejection head configured to eject a plurality of types of liquids through a plurality of nozzles, a cap configured to form a closed space in which the plurality of nozzles open, and a cleaning unit configured to perform cleaning that causes the liquids to be discharged from the nozzles to the cap and causes the liquids to be discharged from the cap to an outside of the cap, the method including performing the cleaning based on a result of correcting a relationship between a change in water evaporation rate and a change in viscosity of each of the plurality of types of liquids by using an amount of water contained in each of the plurality of types of liquids before water evaporation, a humectant substance amount in each of the plurality of types of liquids, an amount of water contained, before water evaporation, in a mixed liquid that is a mixture of the plurality of types of liquids, and a humectant substance amount in the mixed liquid.

According to this method, the relationship between the change in water evaporation rate and the change in viscosity of each of the plurality of types of liquids is corrected using the amount of water and the humectant substance amount contained in each of the plurality of types of liquids and the mixed liquid. The mixed liquid is a mixture, in the cap, of the plurality of types of liquids discharged from the plurality of nozzles. Thus, by performing cleaning based on the correction result, it is possible to perform cleaning considering the plurality of types of liquids and the mixed liquid and prevent an increase in the viscosity of liquid in the nozzles.

(B) In the method for controlling the liquid ejection apparatus, when a liquid that reaches a specified viscosity P at a lowest water evaporation rate among the plurality of types of liquids is set as a reference liquid as the result of the correction and the water evaporation rate at which the reference liquid reaches the specified viscosity P is defined as a specified water evaporation rate, the cleaning may be performed based on the specified water evaporation rate.

According to this method, cleaning is performed based on the specified water evaporation rate of the reference liquid which most easily increases in viscosity among the plurality of types of liquids. That is, because cleaning is performed in accordance with a liquid which easily increases in viscosity, it is possible to further prevent an increase in viscosity in the nozzles.

(C) In the method for controlling the liquid ejection apparatus, the cleaning may be performed when a water evaporation rate in the cap has reached the specified water evaporation rate.

According to this method, because cleaning is performed when the water evaporation rate in the cap has reached the specified water evaporation rate, it is possible to reduce the risk that the viscosity of liquid in the nozzles will increase, causing an ejection failure.

(D) In the method for controlling the liquid ejection apparatus, the cleaning may be performed when a water evaporation rate in the cap has reached a preliminary water evaporation rate lower than the specified water evaporation rate. According to this method, because cleaning is performed when the water evaporation rate in the cap has reached the preliminary water evaporation rate that is lower than the specified water evaporation rate, it is possible to reduce the risk that the water evaporation rate in the cap will exceed the specified water evaporation rate.

(E) In the method for controlling the liquid ejection apparatus, a cumulative value of an amount of water evaporated from the mixed liquid in the cap may be set to zero upon the cleaning.

According to this method, it is possible to reduce the load on the control unit, for example, compared to when the water evaporation rate is calculated.

(F) The method for controlling the liquid ejection apparatus may further include calculating an updated water evaporation rate based on an amount of water contained in a liquid with which the cap is replenished by the cleaning and a water evaporation rate in the cap immediately before the cleaning, and setting the water evaporation rate in the cap to the updated water evaporation rate upon the cleaning.

According to this method, because the water evaporation rate in the cap after cleaning is set to the calculated updated water evaporation rate, it is possible to improve the accuracy of the water evaporation rate in the cap after cleaning.

(G) A liquid ejection apparatus includes a liquid ejection head configured to eject a plurality of types of liquids through a plurality of nozzles, a cap configured to form a closed space in which the plurality of nozzles open, a cleaning unit configured to perform cleaning that causes the liquids to be discharged from the nozzles to the cap and causes the liquids to be discharged from the cap to an outside of the cap, and a control unit configured to cause the cleaning unit to perform the cleaning based on a result of correcting a relationship between a change in water evaporation rate and a change in viscosity of each of the plurality of types of liquids by using an amount of water contained in each of the plurality of types of liquids before water evaporation, a humectant substance amount in each of the plurality of types of liquids, an amount of water contained, before water evaporation, in a mixed liquid that is a mixture of the plurality of types of liquids, and a humectant substance amount in the mixed liquid.

According to this configuration, it is possible to achieve the same advantages as the method for controlling the liquid ejection apparatus described above.

What is claimed is:

1. A method for controlling a liquid ejection apparatus including a liquid ejection head configured to eject a plurality of types of liquids through a plurality of nozzles, a cap configured to form a closed space in which the plurality of nozzles open, and a cleaning unit configured to perform cleaning that causes the liquids to be discharged from the nozzles to the cap and causes the liquids to be discharged from the cap to an outside of the cap, the method comprising performing the cleaning based on a result of correcting a relationship between a change in water evaporation rate and a change in viscosity of each of the plurality of types of liquids by using:

an amount of water contained in each of the plurality of types of liquids before water evaporation;

a humectant substance amount in each of the plurality of types of liquids;

an amount of water contained, before water evaporation, in a mixed liquid that is a mixture of the plurality of types of liquids; and a humectant substance amount in the mixed liquid.

2. The method according to claim 1, wherein, in the result of correcting, when a liquid that reaches a specified viscosity at a lowest water evaporation rate among the plurality of types of liquids is defined as a reference liquid and the water evaporation rate at which the reference liquid reaches the specified viscosity is defined as a specified water evaporation rate, the cleaning is performed based on the specified water evaporation rate.

3. The method according to claim 2, wherein the cleaning is performed when a water evaporation rate in the cap reaches the specified water evaporation rate.

4. The method according to claim 2, wherein the cleaning is performed when a water evaporation rate in the cap reaches a preliminary water evaporation rate lower than the specified water evaporation rate.

5. The method according to claim 1, wherein a cumulative value of an amount of water evaporated from the mixed liquid in the cap is set to zero upon the cleaning.

6. The method according to claim 1, further comprising:

calculating an updated water evaporation rate based on an amount of water contained in a liquid with which the cap is replenished by the cleaning and a water evaporation rate in the cap immediately before the cleaning; and setting the water evaporation rate in the cap to the updated water evaporation rate upon the cleaning.

7. A liquid ejection apparatus comprising:

a liquid ejection head configured to eject a plurality of types of liquids through a plurality of nozzles;

a cap configured to form a closed space in which the plurality of nozzles open;

a cleaning unit configured to perform cleaning that causes the liquids to be discharged from the nozzles to the cap and causes the liquids to be discharged from the cap to an outside of the cap; and a control unit, wherein the control unit is configured to cause the cleaning unit to perform the cleaning based on a result of correcting a relationship between a change in water evaporation rate and a change in viscosity of each of the plurality of types of liquids by using:

an amount of water contained in each of the plurality of types of liquids before water evaporation;

a humectant substance amount in each of the plurality of types of liquids;

an amount of water contained, before water evaporation, in a mixed liquid that is a mixture of the plurality of types of liquids; and a humectant substance amount in the mixed liquid.

* * * * *